(12) United States Patent
Noguchi

(10) Patent No.: US 11,475,687 B2
(45) Date of Patent: Oct. 18, 2022

(54) INFORMATION PROCESSING SYSTEM

(71) Applicant: FUJIFILM Business Innovation Corp., Tokyo (JP)

(72) Inventor: Soushi Noguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 253 days.

(21) Appl. No.: 16/858,732

(22) Filed: Apr. 27, 2020

(65) Prior Publication Data

US 2021/0103722 A1    Apr. 8, 2021

(30) Foreign Application Priority Data

Oct. 4, 2019   (JP) ................................. 2019-183908

(51) Int. Cl.
| | |
|---|---|
| *G06V 30/414* | (2022.01) |
| *H04N 1/00* | (2006.01) |
| *G06V 30/416* | (2022.01) |
| *G06V 30/10* | (2022.01) |

(52) U.S. Cl.
CPC .......... *G06V 30/414* (2022.01); *G06V 30/416* (2022.01); *H04N 1/00331* (2013.01); *G06V 30/10* (2022.01)

(58) Field of Classification Search
CPC .... G06V 30/10; G06V 30/414; G06V 30/416; H04N 1/00331; H04W 8/20
See application file for complete search history.

(56) References Cited

U.S. PATENT DOCUMENTS

| | | | |
|---|---|---|---|
| 8,170,537 B1* | 5/2012 | Bort ...................... | H04M 1/271 455/418 |
| 2007/0024890 A1* | 2/2007 | Murata .................. | H04N 1/444 358/1.14 |
| 2008/0090597 A1* | 4/2008 | Celik ..................... | H04W 4/14 455/466 |

FOREIGN PATENT DOCUMENTS

JP     2009225263     10/2009

OTHER PUBLICATIONS

Gao, et al. (Computer English Translation of Korean Patent No. KR 2016-0084307 A), pp. 1-13. (Year: 2016).*

* cited by examiner

*Primary Examiner* — Daniel G Mariam
(74) *Attorney, Agent, or Firm* — JCIPRNET

(57) ABSTRACT

An information processing system includes a text acquisition unit that acquires text on the basis of a first user's operation, a reception unit that receives a keyword in response to a second user's operation; and a contact support unit that receives a contact from the second user having performed an operation on the keyword to the first user having performed an operation on the text, and notifies the first user of the contact, in a case where the text acquired by the text acquisition unit and the keyword received by the reception unit satisfy a predefined condition.

17 Claims, 6 Drawing Sheets

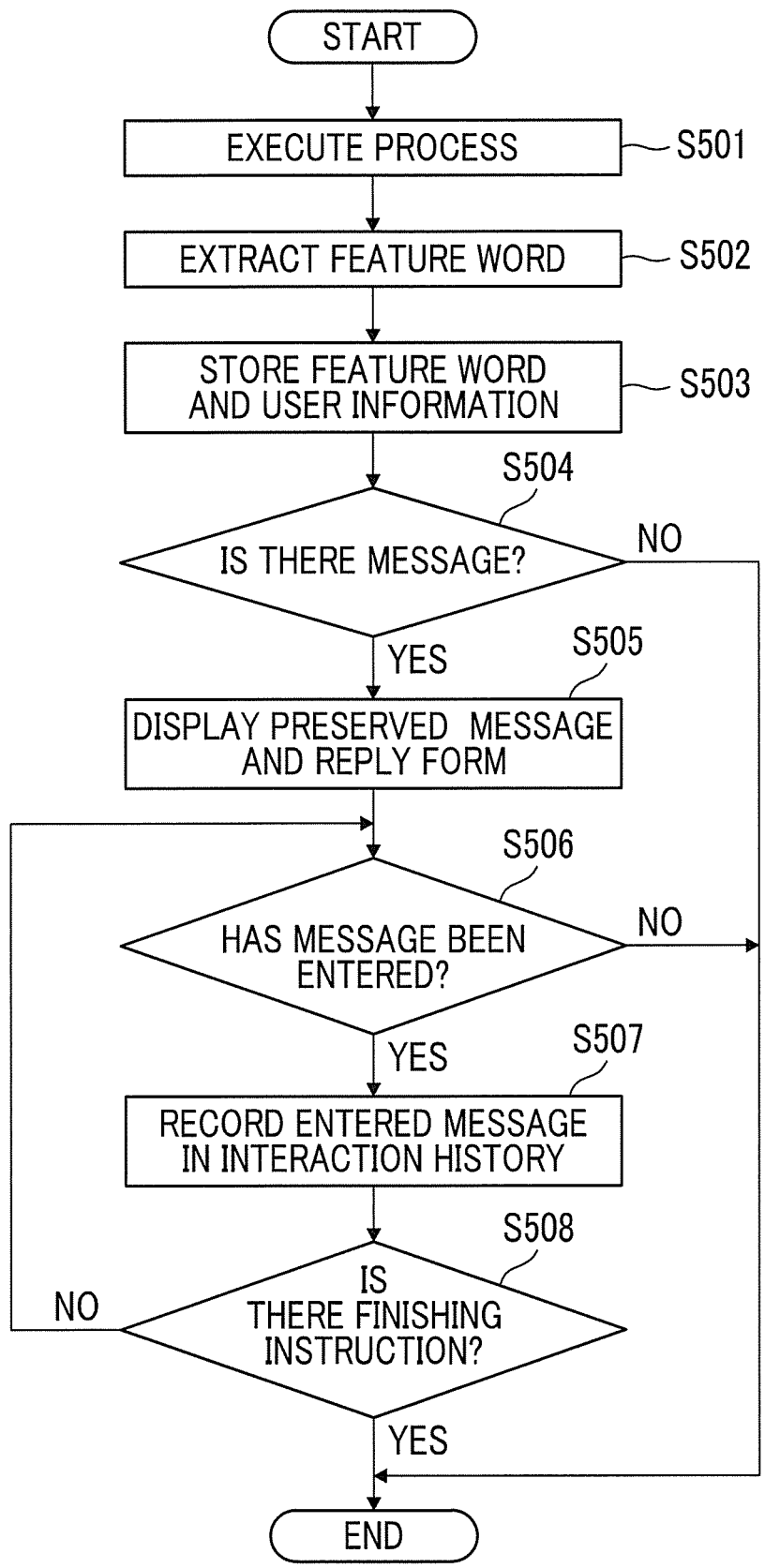

INFORMATION PROCESSING SYSTEM

CROSS-REFERENCE TO RELATED APPLICATIONS

This application is based on and claims priority under 35 USC 119 from Japanese Patent Application No. 2019-183908 filed Oct. 4, 2019.

BACKGROUND

(i) Technical Field

The present invention relates to an information processing system.

(ii) Related Art

In the related art, various pieces of information are provided to a user of an image processing apparatus.

JP2009-225263A discloses an advertisement output method including retrieving an advertisement insertion region by analyzing a layout during printing of original data, the original data including text information and image information included in document data of a document before an advertisement is inserted; extracting a retrieval key including a keyword or a key image for presenting an advertisement from the text information or the image information included in the original data disposed near the advertisement insertion region; acquiring information regarding an advertisement associated with the extracted retrieval key; and generating and printing combined document data in which the information regarding the advertisement and the original data are combined in the unit of pages to be laid out.

SUMMARY

In the related art, provision of information using an information processing system such as an image processing apparatus is performed in one direction from an information provider to a user of the image processing apparatus, and does not suppose that information is exchanged between users of the image processing apparatus.

Aspects of non-limiting embodiments of the present disclosure relate to an information processing system that supports bidirectional exchange of information among plural users of an information processing system shared by the users.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a text acquisition unit that acquires text on the basis of a first user's operation, a reception unit that receives a keyword in response to a second user's operation; and a contact support unit that receives a contact from the second user having performed an operation on the keyword to the first user having performed an operation on the text, and notifies the first user of the contact, in a case where the text acquired by the text acquisition unit and the keyword received by the reception unit satisfy a predefined condition.

BRIEF DESCRIPTION OF THE DRAWINGS

Exemplary embodiment(s) of the present invention will be described in detail based on the following figures, wherein:

FIG. 5 is a flowchart illustrating an operation based on the contact support function of the control section, and is a flowchart illustrating an operation when a first user performs imaging processing; and FIGS. 6A and 6B are diagrams illustrating examples of screens displayed during interaction supporting, in which FIG. 6A is a diagram illustrating an example of a message exchange screen, and FIG. 6B is a diagram illustrating an example of a contact details presentation screen.

DETAILED DESCRIPTION

System Configuration

Hereinafter, an exemplary embodiment of the present invention will be described in detail with reference to the accompanying drawings.

Figure 1:
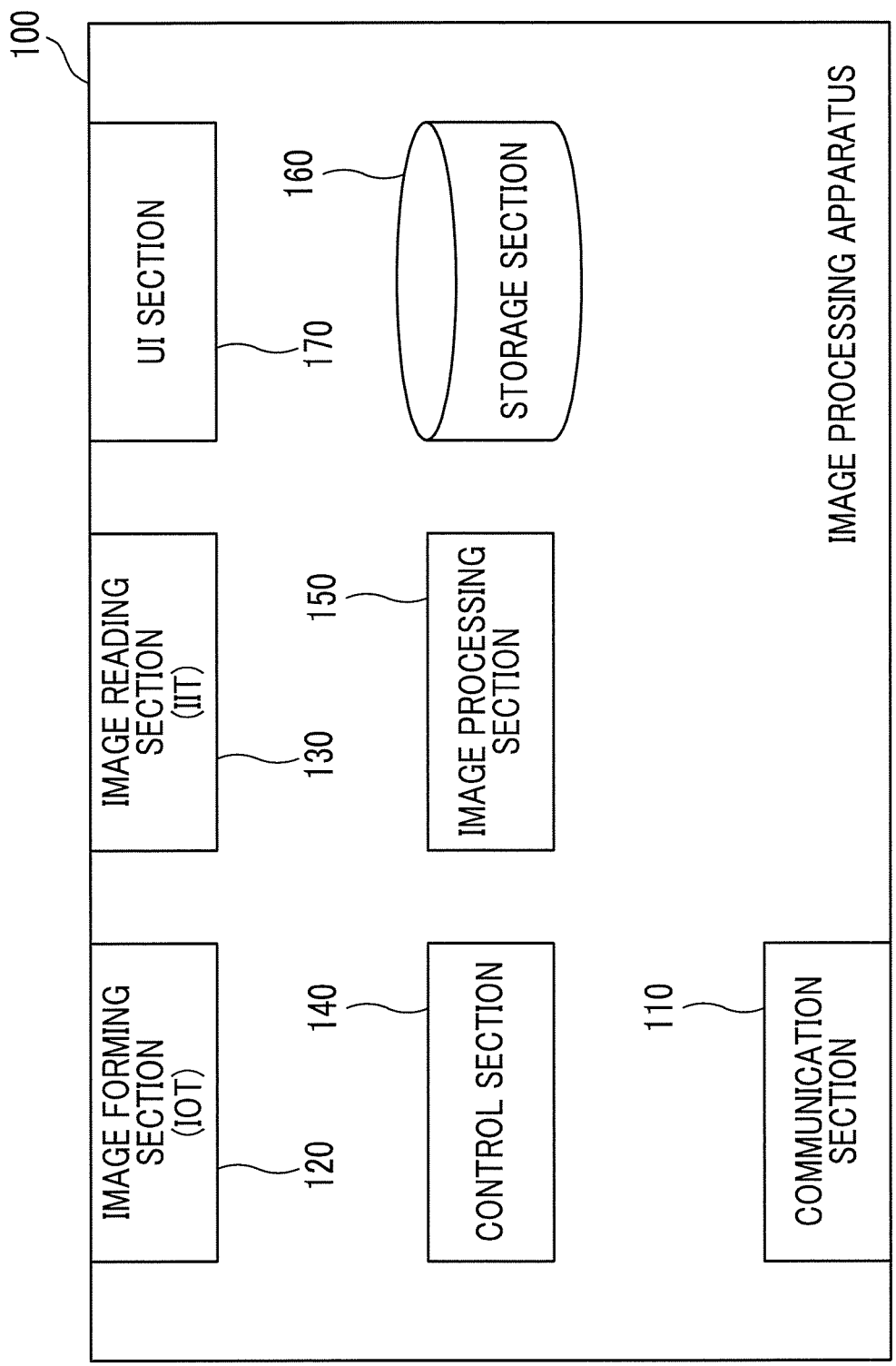
FIG. 1 is a diagram illustrating a configuration of an information processing system to which the present exemplary embodiment is applied.

FIG. 1 is a diagram illustrating a configuration of an information processing system to which the present exemplary embodiment is applied. The information processing system of the present exemplary embodiment is applied to an apparatus shared by many users within a certain range. In a specific example, there is an image processing apparatus provided in an office. Hereinafter, a description will be made of an example in which the information processing system of the present exemplary embodiment is applied to an image processing apparatus.

An image processing apparatus 100 includes a communication section 110, an image forming section 120, an image reading section 130, a control section 140, an image processing section 150, a storage section 160, and a user interface (UI) section 170. The image processing apparatus 100 is an example of an image processing unit.

The communication section 110 is a network interface connecting the image processing apparatus 100 to a network and is used to perform data exchange. A network connection method in the communication section 110 is not particularly limited, and a communication line may be a wired line or a wireless line.

The image forming section 120 is an image output terminal (IOT). The image forming section 120 is configured with a so-called printer device, and forms an image based on image data on a paper sheet that is an example of a recording material by using image forming materials. As a method of forming an image on a recording material, for example, an electrophotographic method of forming an image by transferring toner attached to a photoreceptor onto a recording material, or an ink jet method of forming an image by ejecting ink onto a recording material is used. The image forming section 120 is an example of an image forming unit.

The image reading section 130 is an image input terminal (IIT). The image reading section 130 is configured with a so-called scanner device, and optically reads an image on a set original and thus generate read image (image data). As an image reading method, for example, a CCD method in which a reflected light of light applied to an original from a light source is reduced by a lens and is received by a charge coupled device (CCD), or a CIS method in which reflected light of light sequentially applied to an original from a light emitting diode (LED) light source is received by a contact image sensor (CIS) may be used. The image reading section 130 is an example of a reading unit.

The control section 140 controls an operation of the image processing apparatus 100. Specifically, the control section 140 controls operations such as communication with external apparatuses using the communication section 110, execution of a process performed by using the image forming section 120 or the image reading section 130, and information presentation to a user and reception of an operation from the user using the UI section 170. The control section 140 includes a central processing unit (CPU) that is a calculation unit, and a main storage device that is a storage unit. The CPU reads a program to the main storage device, and executes the program. The CPU executes the program, and thus the variety of control and processes are executed.

The image processing section 150 executes image processing such as color correction or grayscale correction on a processing target image with respect to a process executed by the image forming section 120 or the image reading section 130.

The storage section 160 stores various pieces of data or programs. Specifically, the storage section 160 stores data such as processing target images, operation history data of the image forming section 120 or the image reading section 130, and programs for controlling an operation of the image processing apparatus 100. As the storage section 160, a nonvolatile storage unit such as a magnetic disk device or a solid state drive (SSD) is used.

The UI section 170 includes a display unit that displays a screen such as an operation screen or an information presentation screen, and an entry unit on which an operator performs an entry operation. An entry operation is performed on the entry unit according to an operation screen displayed on the display unit, and thus various control commands or control data is input. For example, a liquid crystal display is used as the display unit. For example, a hardware key or a touch sensor is used as the entry unit. In an example, the UI section 170 may be configured by using a touch panel in which a liquid crystal display as the display unit and a touch sensor as the entry unit are combined with each other.

Hardware Configuration of Control Section 140

Figure 2:
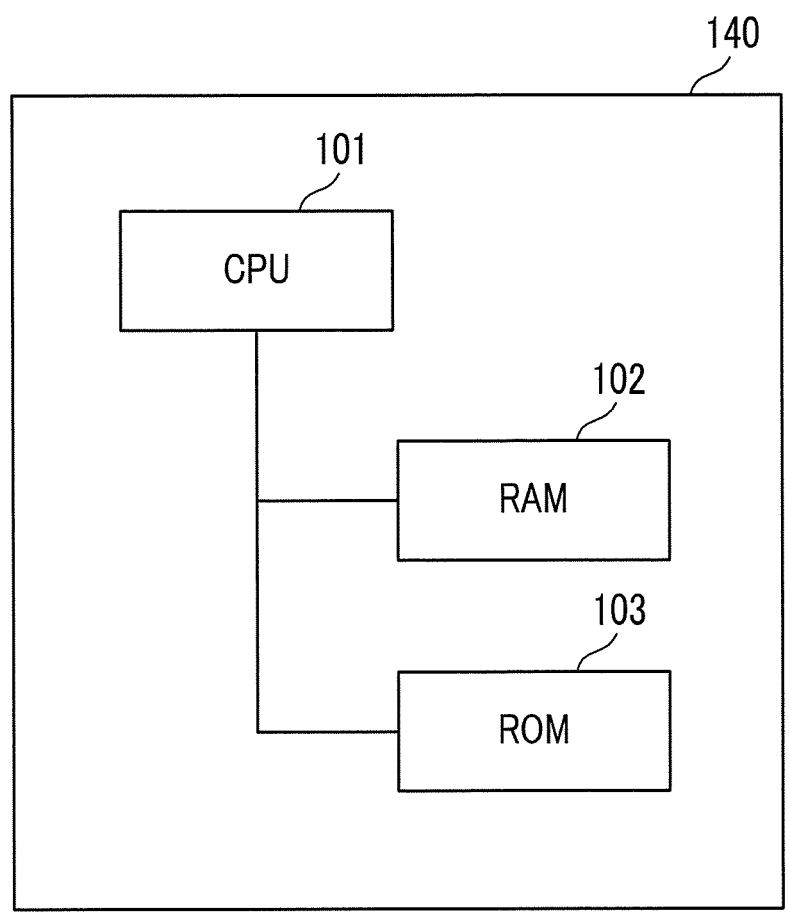
FIG. 2 is a diagram illustrating a hardware configuration example of a control section.

FIG. 2 is a diagram illustrating a hardware configuration example of the control section 140. The control section 140 is realized by a computer, and includes a central processing unit (CPU) 101 that is a calculation unit, and a random access memory (RAM) 102 and a read only memory (ROM) 103 that are storage units. The RAM 102 is a main storage device (main memory), and is used as a work memory while the CPU 101 performs a calculation process. The ROM 103 stores a program or data such as a set value that is prepared in advance, and the CPU 101 may execute a process by directly reading the program or the data from the ROM 103. The program is also stored in the storage section 160 (refer to FIG. 1), and the CPU 101 reads the program stored in the storage section 160 to the main storage device, and executes the program. A result of a process executed by the CPU 101 is stored and preserved in the storage section 160.

Functional Configuration of Control Section 140

The control section 140 of the present exemplary embodiment has not only the function of controlling an operation of the image processing apparatus 100 but also functions (hereinafter, a contact support function) as a contact support unit that supports mutual contacts between users of the image processing apparatus 100. The control section 140 as the contact support unit acquires text from a document that is a processing target in the image forming section 120 or the image reading section 130, and supports mutual contacts between a user who has performed a process using the image forming section 120 or the image reading section 130 and a user who has entered a keyword through matching using the obtained text and the keyword that is separately acquired. Hereinafter, the user having performed a process using the image forming section 120 or the image reading section 130 will be referred to as a first user, and the user having entered a keyword will be referred to as a second user.

Figure 3:
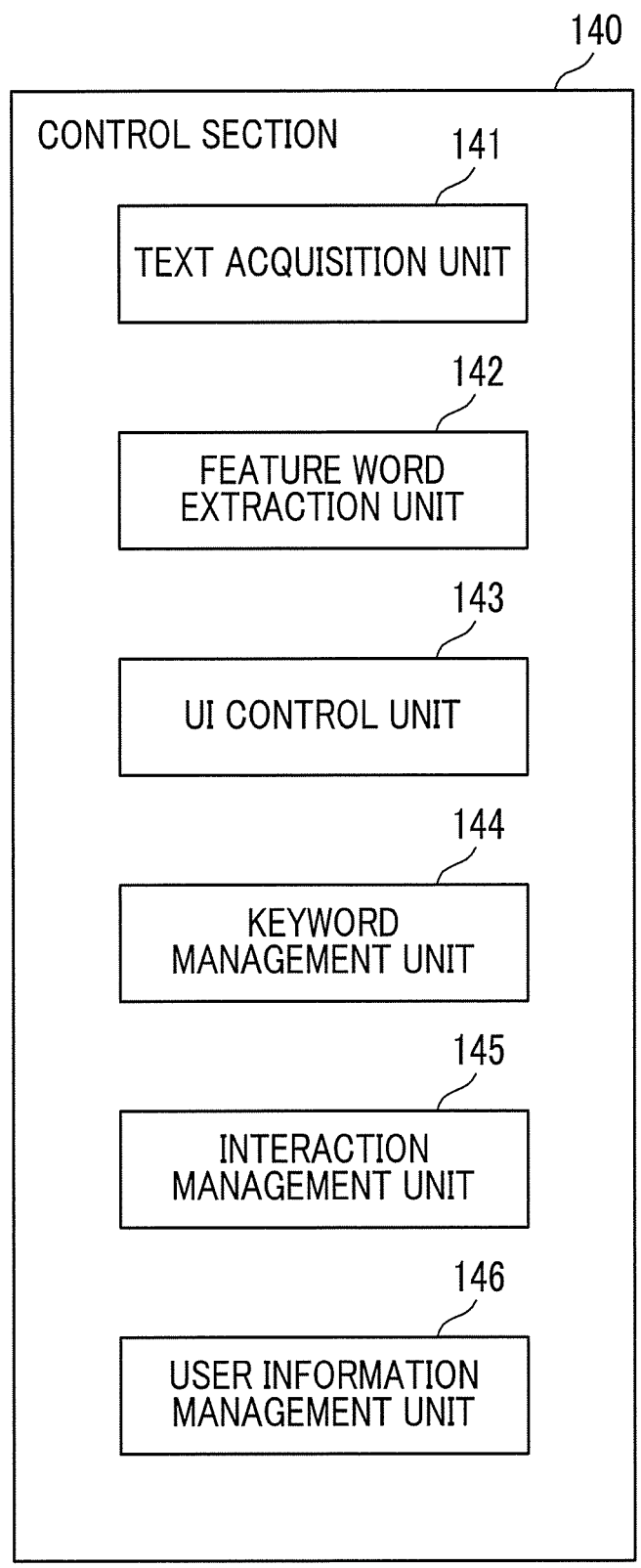
FIG. 3 is a diagram illustrating a functional configuration of the control section.

FIG. 3 is a diagram illustrating a functional configuration of the control section 140. The control section 140 includes a text acquisition unit 141, a feature word extraction unit 142, an UI control unit 143, a keyword management unit 144, an interaction management unit 145, and a user information management unit 146. FIG. 3 illustrates only the contact support function of the control section 140.

The text acquisition unit 141 acquires text on the basis of an operation of a first user. The text is document data processed by the image processing apparatus 100. Specifically, the text acquisition unit 141 acquires text by performing a character recognition process on an image read by the image reading section 130. The text acquisition unit 141 directly acquires the text from processing target document data output from the image forming section 120. The text acquisition unit 141 is an example of a text acquisition unit and is an example of a recognition unit.

The feature word extraction unit 142 extracts a feature word from the text acquired by the text acquisition unit 141. The feature word may be extracted on the basis of various criteria. For example, a word that frequently appears in text, a word that is used in a title of text or a chapter of text formed of chapters, or a proper noun may be extracted as the feature word. In addition, the feature word may be extracted according to various existing methods used for document analysis or the like. The feature word extraction unit 142 is an example of an extraction unit.

The UI control unit 143 controls the UI section 170 of the image processing apparatus 100 to display an operation screen or an information presentation screen on the display unit of the UI section 170 and thus to receive an entry operation on the entry unit of the UI section 170. The UI control unit 143 not only receives input of an execution instruction for executing a process in the image forming section 120 or the image reading section 130 but also displays a keyword entry screen and receives entry of a keyword from the second user. The UI control unit 143 displays a message exchange screen, displays messages preserved for the first and second users, and receives entry of a message. The UI control unit 143 may display a keyword entry screen when the first user is using the image processing apparatus 100, and may receive entry of a keyword from the first user. The UI control unit 143 and the UI section 170 are an example of a reception unit, an example of a display unit, and an example of an entry unit.

The keyword management unit 144 manages the feature word extracted by the feature word extraction unit 142 as a retrieval keyword. The keyword management unit 144 stores identification information of the text from which the feature word as a keyword is extracted and identification information of the first user having executed the process in which the text is acquired in correlation with the keyword. In a case where a keyword is entered by the second user, the first user is retrieved on the basis of the entered keyword.

The interaction management unit 145 stores and manages a message received by the UI control unit 143. The message is stored along with a user having entered the message and identification information of a destination user of the message. The message includes both of a message from the second user to the first user and a message from the first user to the second user. In a case where the user who is a destination of the message uses the image processing apparatus 100, the interaction management unit 145 notifies the user that there is the message addressed to the user, and presents the message according to the user's operation. The notification that there is the message and the presentation of the message are performed, for example, through display on the display unit of the UI section 170.

The interaction management unit 145 creates and manages an interaction history according to message exchange between users. The interaction history is created in a case where a message from the second user to the first user is entered for the first time, and is updated whenever messages are exchanged. The created interaction history is stored in, for example, the storage section 160. For example, a user having entered a message and identification information of a destination user of the message, the date and time of the entry of the message, the date and time of the presentation of the message, and a content of the message are recorded in the interaction history.

The user information management unit 146 manages contact details information of a user according to a contact method (hereinafter, a second contact method) that is different from the contact support function of the image processing apparatus 100. Contact between users is initially performed through message exchange using the contact support function of the image processing apparatus 100. In contrast, one of the first user and the second user may present the second contact method that is different from the contact support function of the image processing apparatus 100 to the other user such that transition to a direct interaction relationship occurs. The user information management unit 146 manages contact details information in the second contact method. Specifically, the user information management unit 146 stores the contact details information and a presentation condition for the contact details information. In a case where the presentation condition is satisfied, the user information management unit 146 presents the stored contact details information.

The contact details information is contact details using a contact method wanted by a user. The contact details may be set by using various contact methods available to a user, such as an electronic mail address, a telephone number, a social networking service (SNS) account, and a Uniform Resource Locator (URL) of a blog or a personal website. The contact method may be direct meeting. In this case, for example, the time, date, and place that can cope with a visit or a meeting may be set as the contact details.

The presentation condition for the contact details information may be set on the basis of a use status of message exchange using the contact support function of the image processing apparatus 100. For example, the presentation condition may be set according to the number of times of message exchange, and may be set according to a frequency of message exchange. A separate condition may be set according to a keyword in a case where a first user is retrieved. In a case where such a presentation condition is satisfied, the user information management unit 146 presents contact details information based on the second contact method of a destination user in a case where one user uses the contact support function of the image processing apparatus 100. Even though the presentation condition is not satisfied, contact details information may be presented according to a destination user's setting operation (in other words, with the destination user's setting operation as a presentation condition). The contact details information is displayed on, for example, display unit of the UI section 170 to be presented.

Support Using Contact Support Function

The control section 140 supports contact between users using the image processing apparatus 100 according to the contact support function. The support of contact between users performed by the control section 140 is performed in two stages. The first stage is interaction performed through message exchange using the UI section 170 of the image processing apparatus 100. The second stage is transition to interaction using the second contact method prepared by a user. Hereinafter, support in each stage will be described in detail.

In the first stage, in a case where text acquired by the text acquisition unit 141 in response to the first user's operation and a keyword received by the UI control unit 143 in response to the second user's operation satisfy a predefined condition, the control section 140 causes the interaction management unit 145 to notify the first user of a message from the second user. The case of satisfying the predefined condition is, for example, a case where the keyword entered by the second user is included in the acquired text. In the following operation, the first user and the second user use the image processing apparatus 100 through user authentication. Therefore, the control section 140 identifies users using the image processing apparatus 100 on the basis of authentication information used in the authentication process. The image processing apparatus 100 may include an authentication unit to perform the user authentication, and an authentication result may be acquired by requesting the user authentication to an external authentication server.

First, in a case where the first user performs a process such as printing of a document using the image forming section 120 or reading of a document image using the image reading section 130 by operating the image processing apparatus 100, the text acquisition unit 141 acquires text from the processing target document. In a case where the text acquisition unit 141 acquires the text, the feature word extraction unit 142 extracts a feature word from the acquired text. The extracted feature word is managed by the keyword management unit 144 along with identification information of the first user and identification information of the text from which the feature word is extracted.

Next, in a case where the second user operates the UI section 170 of the image processing apparatus 100 so as to enter a keyword, the keyword management unit 144 retrieves a feature word corresponding to the entered keyword from the managed feature word. Here, the feature word corresponding to the keyword does not indicate the same feature word as the keyword. For example, a feature word corresponding to a keyword may be specified by comparing words to which the keyword and the feature word are respectively normalized. A keyword and a feature word may be expressed by word vectors, and the feature word corresponding to the keyword may be specified on the basis of the similarity between the vectors.

In a case where the feature word corresponding to the keyword is detected, text including the feature word is specified, and the first user having executed the process on the text (document) is specified. The first user is a user who is a transmission destination of a message from the second user. Plural keywords may be entered, and, in a case where plural keywords are entered, text is specified with respect to each entered keyword, and the first user is specified.

Next, in a case where the second user operates the UI section 170 of the image processing apparatus 100 so as to enter a message, the interaction management unit 145 receives the message, and manages the message along with identification information of the second user having entered the message with the first user specified by the keyword management unit 144 as a transmission destination of the message. In a case where a first message is received from the second user, the interaction management unit 145 creates and manages an interaction history based on the message. The interaction history is subsequently updated whenever messages are exchanged between the first user and the second user.

Here, a case is assumed in which there are plural text parts including a feature word corresponding to a keyword, and there are plural first users having executed a process on the text parts. In this case, detected plural first users may be transmission destinations of a message, and, among the plural first users, only first users specified on the basis of a predefined rule may be transmission destinations of a message. As an example of a rule of specifying the first user as a transmission destination of a message, there may be a rule based on the number of keywords included in text or weight information imparted to a keyword. For example, in a case where plural keywords are entered by the second user, and each of plural text parts specified by the keyword management unit 144 includes a feature word corresponding to one or plural keywords, a first user for a text part including more feature words may be set as a transmission destination of a message. Therefore, in this case, the interaction management unit 145 receives a message addressed to a first user having performed an operation on text including more keywords.

As the rule based on the weight information, for example, weight information is imparted to at least one of keywords (feature words) extracted from text or keywords entered by a second user, and a first user for text including a keyword imparted with the greatest weight information may be set as a transmission destination of a message. Therefore, in this case, the interaction management unit 145 receives a message addressed to a first user having performed an operation on text including the keyword imparted with the greatest weight information. The weight information may be imparted to a keyword entered by a second user, for example, when the keyword is entered. A great weight value may be imparted to a keyword that frequently appears in text with respect to keywords (feature words) extracted from the text.

Next, in a case where the first user set as a transmission destination of the message entered by the second user operates the image processing apparatus 100 to perform a process, the interaction management unit 145 presents the message from the second user to the first user. The message is presented, for example, by the UI control unit 143 displaying a message exchange screen on the display unit of the UI section 170. Specifically, in a case where the first user operates the image processing apparatus 100, display for a notification that there is the message addressed to the first user from the second user is performed along with information regarding an operation, and the message exchange screen is displayed by receiving an instruction for displaying the message from the first user. The display for a notification that there is the message may be performed after the first user operates the image processing apparatus 100. The message exchange screen is provided with, for example, a response message entry form along with the presented message. In a case where the first user enters a response message to the entry form of the message exchange screen, the interaction management unit 145 manages the entered response message in association with the presented message. In a case where the first user uses the image processing apparatus 100 next, the interaction management unit 145 presents a response message addressed to the first user. The message may be presented by the UI control unit 143 displaying a message exchange screen on the display unit of the UI section 170 in the same manner as presentation of a message to the first user from the second user. The interaction management unit 145 updates the interaction history.

Thereafter, in a case where one of the first user or the second user operates the image processing apparatus 100, when there is a message that is not presented from one user to the other user, the interaction management unit 145 presents the message, and updates the interaction history. In a case where a response message corresponding to the presented message is entered, the interaction management unit 145 manages the response message, and updates the interaction history. In a case where a use status of message exchange shown in the interaction history satisfies a presentation condition for contact details information, there is the occurrence of transition to the second stage in which interaction using the second contact method is performed.

In the second stage, in a case where the second user operates the image processing apparatus 100, the user information management unit 146 presents contact details information based on the second contact method of the first user, to the second user. The contact details information is presented, for example, by the UI control unit 143 displaying a contact details presentation screen on the display unit of the UI section 170. Specifically, in a case where the second user operates the image processing apparatus 100, display for a notification that the contact details information of the first user is viewable is performed along with information regarding an operation, and the contact details presentation screen is displayed by receiving an instruction for displaying the contact details information from the second user. The display for a notification that the contact details information is viewable may be performed after the second user operates the image processing apparatus 100.

The second user having acquired the contact details information of the first user may transition to interaction with the first user using the second contact method. The interaction may be continued through message exchange using the message exchange screen displayed on the UI section 170 of the image processing apparatus 100. In a case where messages are exchanged by using the message exchange screen, the interaction management unit 145 updates the interaction history.

Operation of Control Section 140

Figure 4:
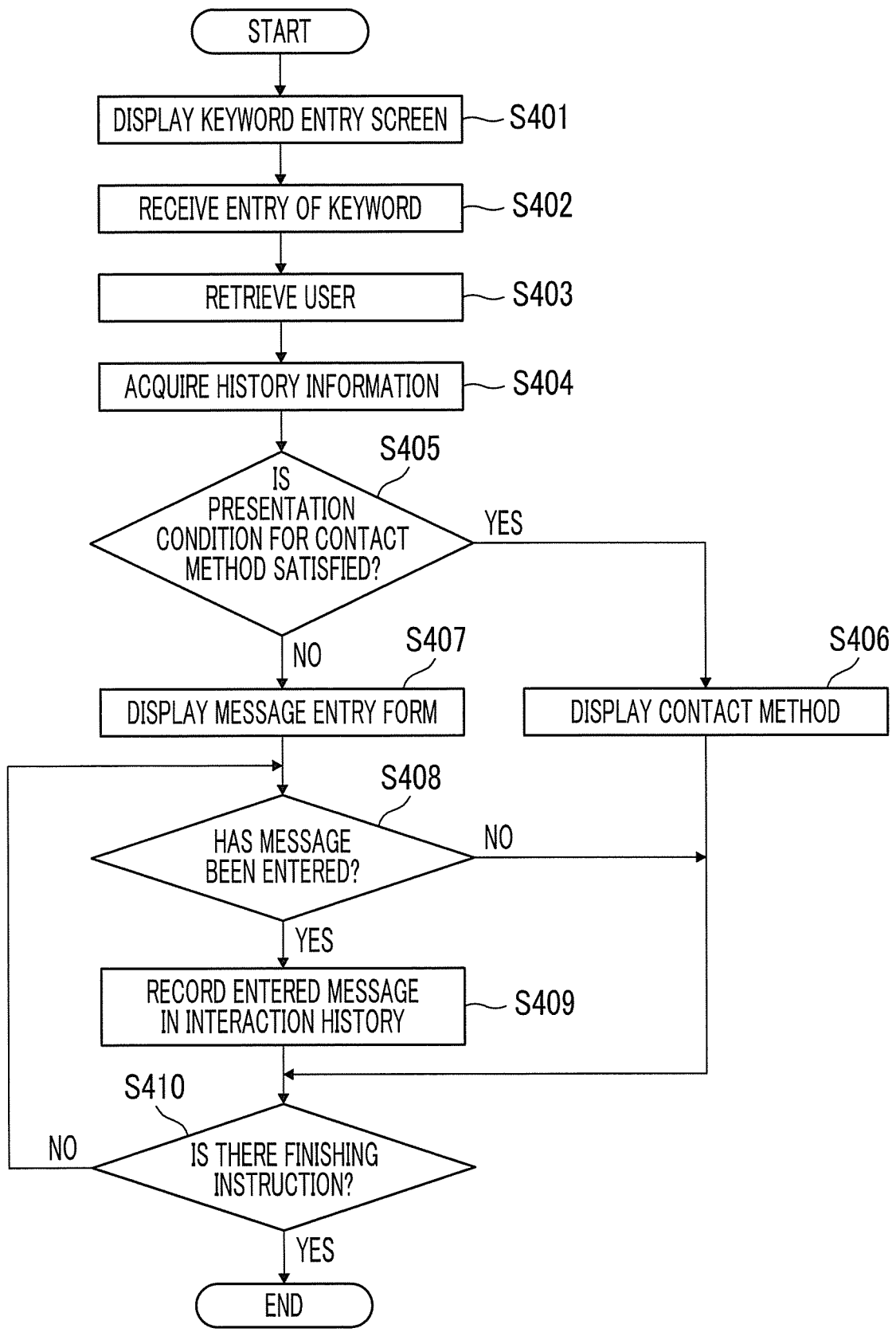
FIG. 4 is a flowchart illustrating an operation based on a contact support function of the control section, and is a flowchart illustrating an operation when a second user enters a keyword.

FIG. 4 is a flowchart illustrating an operation based on the contact support function of the control section 140, and is a flowchart illustrating an operation when a second user enters a keyword. It is assumed that the second user is subjected to user authentication in advance, and thus the control section 140 of the image processing apparatus 100 recognizes the second user. In a case where the second user selects entry of a keyword from an operation menu displayed on the UI section 170, the UI control unit 143 of the control section 140 displays a keyword entry screen on the UI section 170 (S401).

In a case where the user enters a keyword on the keyword entry screen, the UI control unit 143 of the control section 140 receives entry of the keyword (S402), and the keyword management unit 144 retrieves a first user having performed a process on text including a feature word corresponding to the keyword on the basis of the entered keyword (S403). In a case where the first user is detected, the interaction management unit 145 of the control section 140 acquires an interaction history stored in the storage section 160 or the like (S404), and determines whether or not a presentation condition for contact details information based on the second contact method is satisfied (S405).

In a case where the presentation condition for the contact details information based on the second contact method is not satisfied (NO in step S405), the interaction management unit 145 displays a message exchange screen including a message entry form on the UI section 170 (S407). In a case where a message has been entered by the second user, the interaction management unit 145 records and preserves the entered message in the interaction history (S408 and S409). In a case where the second user gives a finishing instruction on the message exchange screen, the control section 140 finishes the process (S410).

In a case where the presentation condition for the contact details information based on the second contact method is satisfied (YES in step S405), the user information management unit 146 displays the contact details information based on the second contact method of the first user on the UI section 170 (S406). Thereafter, interaction using the second contact method is possible between the first user and the second user. In a case where the second user gives a finishing instruction on the message exchange screen, the control section 140 finishes the process (S410).

FIG. 5 is a flowchart illustrating an operation based on the contact support function of the control section 140, and is a flowchart illustrating an operation when a first user performs imaging processing. It is assumed that the first user is subjected to user authentication in advance, and thus the control section 140 of the image processing apparatus 100 recognizes the first user. In a case where the first user selects a process (for example, image reading, document printing, or copying) to be executed from an operation menu displayed on the UI section 170, an operation screen for the selected process is displayed on the UI section 170 according to a normal operation of the control section 140. The first user operates the operation screen so as to give an instruction for executing the process, and thus the control section 140 controls the image forming section 120 or the image reading section 130 to execute the process (S501).

On the basis of the process executed in 5501, the text acquisition unit 141 of the control section 140 acquires text from the processing target document, and the feature word extraction unit 142 extracts a feature word (S502). The keyword management unit 144 stores and manages the extracted feature word and user information of the first user in the storage section 160 or the like (S503).

Next, the interaction management unit 145 examines whether or not there is a message not presented, addressed to the first user, and, in a case where there is no message addressed to the first user (NO in S504), interaction support is not performed by the control section 140, and the process is finished. On the other hand, in a case where there is the message (YES in S504), the interaction management unit 145 displays the preserved message and a message exchange screen including a reply form for entering a response message on the UI section 170 (S505). In a case where a message has been entered by the first user, the interaction management unit 145 records and preserves the entered message in an interaction history (S506 and S507). In a case where the first user gives a finishing instruction on the message exchange screen, the control section 140 finishes the process (S508).

Examples of Display Screens

Figure 6A:
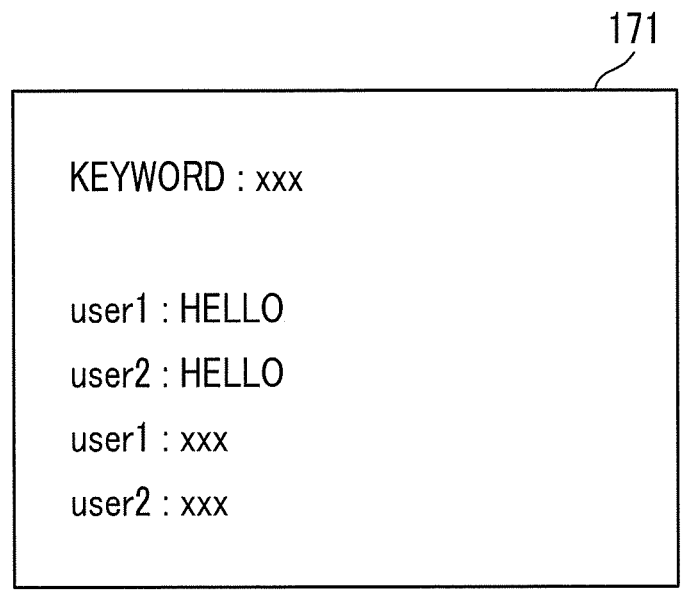
Figure 6B:
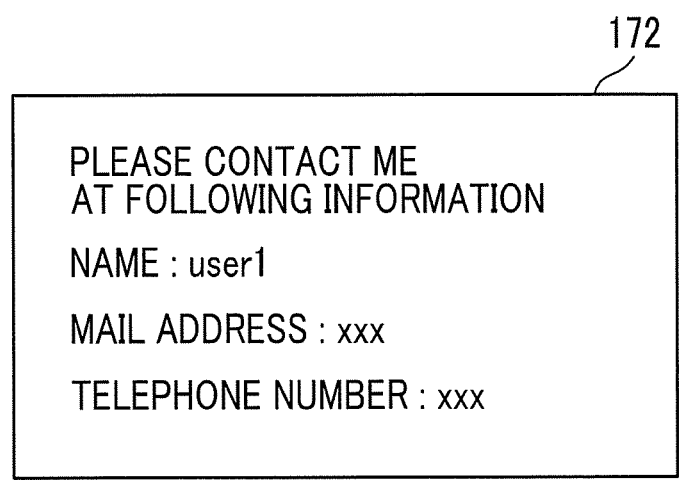

FIGS. 6A and 6B are diagrams illustrating examples of screens displayed during interaction supporting.

A keyword used as a key for specifying the first user and messages exchanged hitherto in this interaction are displayed on a message exchange screen 171 illustrated in FIG. 6A. A last line of the messages is an entry form for the present message, and is used to enter the message. The message exchange screen 171 may be a screen on which the first user and the second user exchanging messages can be specified, at least a message that is entered last is displayed, and an entry form for the present message is provided, and the presence or absence of other information or design of the screen is not particularly limited. As illustrated in the example in FIG. 6A, a keyword or a series of past messages may be displayed, and this information may not be displayed from the beginning, and may be displayed in response to a user's operation.

A message such as "Please contact me at the following information" indicating that the second contact method is provided, the name of the first user, and an electronic mail address and a telephone number corresponding to contact details information are displayed on a contact details presentation screen 172 illustrated in FIG. 6B. The contact details presentation screen 172 may be a screen on which contact details information based on the second contact method provided by the first user is displayed, and the presence or absence of other information or design of the screen is not particularly limited. In a case where direct meeting is wanted as the second contact method, the time, date, and place when and where a visit or a meeting can be performed may be presented. For example, a message indicating contents that the first user stays at an office on Tuesday afternoon to be able to meet and talk with a visitor may be displayed.

As mentioned above, the exemplary embodiment of the present invention has been described, but the technical scope of the present invention is not limited to the exemplary embodiment. For example, in the exemplary embodiment, a description has been made of a case where the first user specifies the second contact method, and presents contact details information, but the second user may also specify the second contact method thereof and may present contact details information.

In the exemplary embodiment, a keyword entered by the second user is correlated with a feature word extracted from text of a document processed by the first user, and the first user is specified as a transmission destination of a message from the second user, but, in addition to a feature word obtained from text, a keyword of the second user may be correlated with attribute information of a document processed by the first user, and the first user may be specified as a transmission destination of a message.

An entry screen used for the first user to enter a keyword may be prepared, entry of a keyword from the first user is received, and the received keyword may be used to specify the first user as a transmission destination of a message instead of a feature word extracted from text. In this case, in a case where the keyword entered by the first user corresponds to a keyword entered by the second user, the first user having entered the keyword is set as a transmission destination of a message from the second user.

In the exemplary embodiment, a description has been made of an example in which the present invention is applied to the image processing apparatus 100, but the present invention may be applied to various information apparatuses provided in offices or stores and shared by many users within a certain range. In addition, various modifications or constituent alterations without departing from the scope of the technical concept of the present invention are included in the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
    a first processor, configured to:
        acquire text on the basis of a first user's operation;
        receive a keyword in response to a second user's operation; and
        receive a contact from the second user having performed an operation on the keyword to the first user having performed an operation on the text, and notify the first user of the contact, in a case where the acquired text and the received keyword satisfy a predefined condition; and
        in a case where the contact between the first user and the second user satisfies another predefined condition, present another contact method for the first user to the second user.

2. The information processing system according to claim 1, further comprising:
    a second processor,
    wherein the first processor acquires text from document data processed by the second processor.

3. The information processing system according to claim 2,
    wherein the second processor receives an image read from a medium and performs character recognition on the read image, and
    wherein the first processor acquires text obtained through the character recognition the recognition unit second processor.

4. The information processing system according to claim 2,
    wherein the second processor generates a document image obtained by developing a processing target document file, and
    wherein the first processor acquires text recorded on the processing target document file.

5. The information processing system according to claim 1, wherein the first processor is further configured to:
    extract a keyword from the acquired text,
    wherein, in a case where the received keyword is included in the extracted keyword, the first processor receives a contact from the second user to the first user, and notifies the first user of the contact.

6. The information processing system according to claim 5,
    wherein, in a case where the received keyword is included in a plurality of text parts acquired on the basis of operations of a plurality of the first users, the first processor receives a contact to the first user specified on the basis of a predefined rule among the plurality of first users, and notifies the first user of the contact.

7. The information processing system according to claim 6,
    wherein the first processor receives a plurality of the keywords, and
    wherein the first processor receives a contact to the first user having performed an operation on the text including a larger number of keywords among the plurality of first users, and notifies the first user of the contact.

8. The information processing system according to claim 6,
    wherein weight information is imparted to at least one of the extracted keyword or the received keyword, and
    wherein the first processor receives a contact to the first user having performed an operation on the text including a keyword imparted with greatest weight information among the plurality of first users, and notifies the first user of the contact.

9. The information processing system according to claim 1, wherein the first processor notifies the first user who is a contact partner that there is a contact from the second user in a case where the first user performs a next operation.

10. The information processing system according to claim 9, further comprising:
    a display that displays information regarding an operation in a case where a user performs the operation,
    wherein, in a case where the first user who is a contact partner performs an operation, the first processor causes the display to perform display for a notification that there is the contact from the second user along with the information regarding the operation.

11. The information processing system according to claim 1, wherein the first processor is further configured to:
    provide the first user to manually enter a keyword,
    wherein, in a case where the received keyword is included in the entered keyword, the first processor receives a contact from the second user to the first user having performed an operation of entering the keyword, and notifies the first user of the contact.

12. The information processing system according to claim wherein the first processor receives a contact from the first user who is a contact partner to the second user who is a contact source, and notifies the second user of the contact.

13. The information processing system according to claim 1,
    wherein, in a case where a condition defined according to the number of contacts between the first user and the second user is satisfied, the first processor presents the another contact method to the second user.

14. The information processing system according to claim 1,
    wherein, in a case where a condition defined according to the frequency of contacts between the first user and the second user is satisfied, the first processor presents the another contact method to the second user.

15. The information processing system according to claim 1,
wherein, as a condition for presenting the another contact method for the first user to the second user, different conditions are set according to keywords.

16. The information processing system according to claim 1,
wherein the first processor presents the another contact method for the first user to the second user in response to an instruction from the first user even though the condition is not satisfied.

17. An information processing system comprising:
text acquisition means for acquiring text on the basis of a first user's operation;
reception means for receiving a keyword in response to a second user's operation; and
contact support means for receiving a contact from the second user having performed an operation on the keyword to the first user having performed an operation on the text, notifying the first user of the contact in a case where the text acquired by the text acquisition means and the keyword received by the reception means satisfy a predefined condition, and presenting another contact method for the first user to the second user in a case where the contact between the first user and the second user satisfies another predefined condition.

* * * * *